US012109817B2

(12) United States Patent
Takeuchi

(10) Patent No.: US 12,109,817 B2
(45) Date of Patent: Oct. 8, 2024

(54) DROPLET DISCHARGE APPARATUS

(71) Applicant: Noriyasu Takeuchi, Kanagawa (JP)

(72) Inventor: Noriyasu Takeuchi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 108 days.

(21) Appl. No.: 17/992,408

(22) Filed: Nov. 22, 2022

(65) Prior Publication Data

US 2023/0234359 A1 Jul. 27, 2023

(30) Foreign Application Priority Data

Jan. 21, 2022 (JP) ................................ 2022-007978

(51) Int. Cl.
*B41J 2/165* (2006.01)

(52) U.S. Cl.
CPC .................................. *B41J 2/1652* (2013.01)

(58) Field of Classification Search
CPC .... B41J 2/1652; B41J 2/1714; B41J 2/17563; B41J 2/185; B41J 2005/008
See application file for complete search history.

(56) References Cited

U.S. PATENT DOCUMENTS 8,690,290 B2 * 4/2014 Masuda ............... B41J 11/0021 347/30
11,130,344 B2 * 9/2021 Masuda ............... B41J 2/16511
11,571,903 B2 * 2/2023 Kobayashi ............. B41J 29/377
2004/0131402 A1 7/2004 Kurotori et al.
2005/0041997 A1 2/2005 Kurotori et al.
2005/0147423 A1 7/2005 Sasaki et al.
2005/0147431 A1 7/2005 Takeuchi et al.
2005/0254867 A1 11/2005 Kurotori et al.
2006/0279603 A1 12/2006 Kusunoki et al.
2007/0098469 A1 5/2007 Yoshino et al.
2011/0298876 A1 12/2011 Takeuchi et al.
2012/0086762 A1 4/2012 Noguchi et al.
2012/0147103 A1 6/2012 Hasegawa et al.
2012/0176456 A1 7/2012 Maekawa et al.
2012/0242768 A1 9/2012 Seno et al.
2013/0065024 A1 3/2013 Aruga et al.
2014/0043393 A1 2/2014 Takeuchi
2015/0077469 A1 3/2015 Kohda et al.
2016/0297195 A1 10/2016 Takeuchi
2019/0217607 A1 7/2019 Akiyama et al.
2019/0240981 A1 * 8/2019 Tachibana .............. B41J 2/1714
(Continued)

FOREIGN PATENT DOCUMENTS

JP 2017-226095 12/2017
JP 2019-137040 8/2019

*Primary Examiner* — Thinh H Nguyen
(74) *Attorney, Agent, or Firm* — Duft & Bornsen, PC

(57) ABSTRACT

A droplet discharge apparatus includes a discharger, a suction device, a connector, and a collector. The discharger discharges droplets. The suction device sucks generated matter when the discharger discharges droplets. The connector connects the discharger with the suction device and includes a path through which the generated matter is to be sent in a suction direction from the discharger toward the suction device. The collector in the path collects the generated matter. The collector has a larger cross-sectional area to collect the generated matter than a cross-sectional area of the connector in at least one of the suction direction or in a direction orthogonal to the suction direction.

20 Claims, 8 Drawing Sheets

(56) References Cited

U.S. PATENT DOCUMENTS

| | | | |
|---|---|---|---|
| 2020/0031125 | A1 | 1/2020 | Takeuchi |
| 2020/0171828 | A1 | 6/2020 | Matsufuji et al. |
| 2022/0055367 | A1 | 2/2022 | Takeuchi |

* cited by examiner

DROPLET DISCHARGE APPARATUS

CROSS-REFERENCE TO RELATED APPLICATIONS

This patent application is based on and claims priority pursuant to 35 U.S.C. § 119(a) to Japanese Patent Application No. 2022-007978, filed on Jan. 21, 2022, in the Japan Patent Office, the entire disclosure of which is hereby incorporated by reference herein.

BACKGROUND

Technical Field

Embodiments of the present disclosure relate to a droplet discharge apparatus.

Related Art

An inkjet-type droplet discharge apparatus is known that discharges droplets toward a recording medium to form an image. In such an inkjet-type droplet discharge apparatus, when the droplet discharge apparatus discharges liquid, minute droplets called mist float in the air in addition to droplets that adhere to the recording medium to form an image. When such mist adheres to the recording medium, the image quality deteriorates. For this reason, a technology is known in which a droplet discharge apparatus collects mist to enhance the image quality.

SUMMARY

In an embodiment of the present disclosure, a droplet discharge apparatus includes a discharger, a suction device, a connector, and a collector. The discharger discharges droplets. The suction device sucks generated matter when the discharger discharges droplets. The connector connects the discharger with the suction device and includes a path through which the generated matter is to be sent in a suction direction from the discharger toward the suction device. The collector in the path collects the generated matter. The collector has a larger cross-sectional area to collect the generated matter than a cross-sectional area of the connector in at least one of the suction direction or in a direction orthogonal to the suction direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
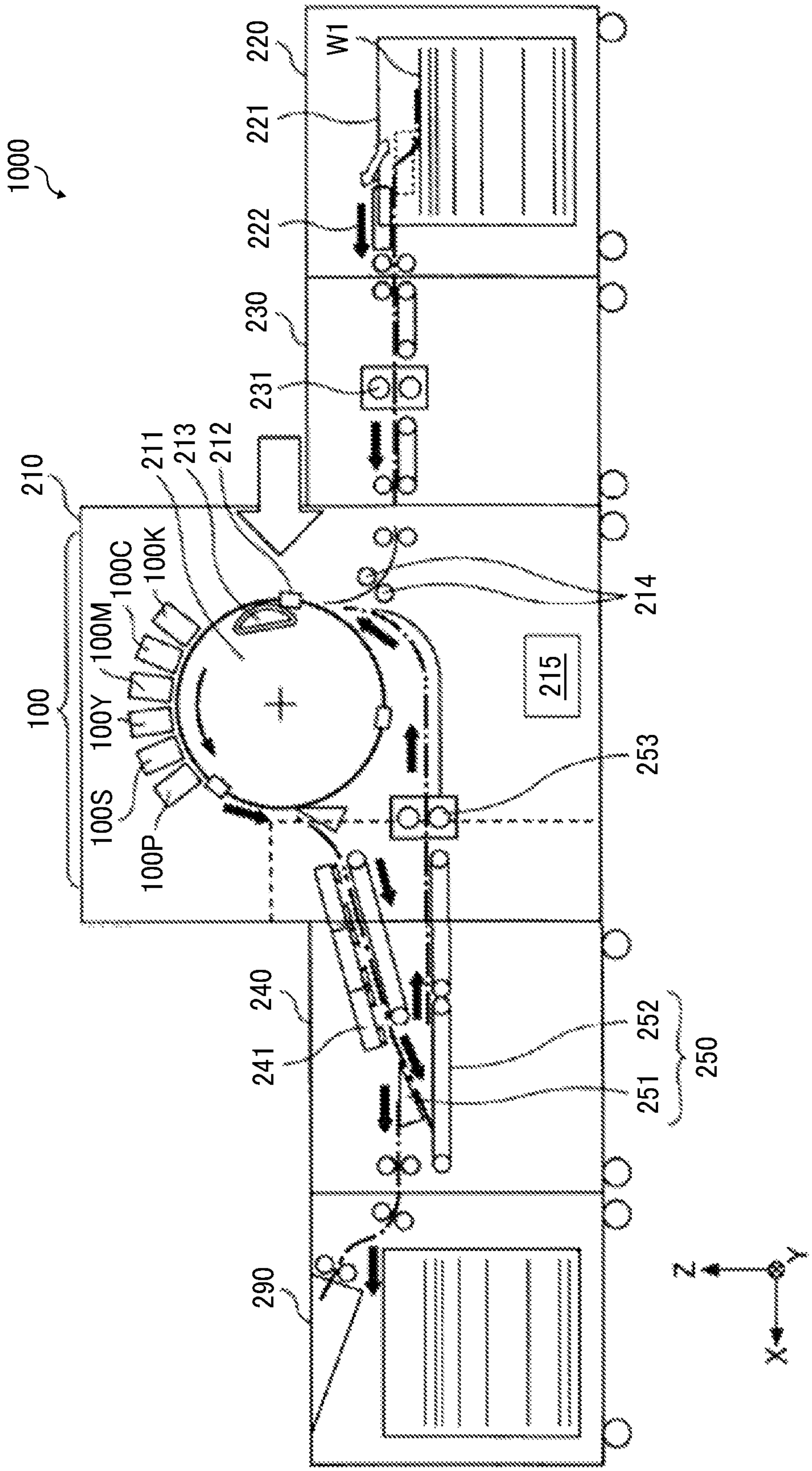
FIG. 1 is a diagram illustrating a configuration example of a droplet discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

Embodiments of the present disclosure will be described with reference to the drawings in the following description. Note that the embodiments are not limited to the specific examples described below.

Example of Droplet Discharge Apparatus

An inkjet printer 1000 as a droplet discharge apparatus according to an embodiment of the present disclosure is described below with reference to FIG. 1. FIG. 1 is a diagram illustrating a configuration example of the inkjet printer 1000 according to the present embodiment. The inkjet printer 1000 illustrated in FIG. 1 is described as an example of a droplet discharge apparatus in the following description.

The inkjet printer 1000 is an image forming apparatus that adopts an on-demand type line-scanning printing method. The inkjet printer 1000 includes an image forming device 210, a sheet feeder 220, a registration adjuster 230, a drier 240, a recording-medium reversing device 250, and a sheet ejection device 290.

First, in the sheet feeder 220, sheets W1, which are examples of recording media stacked on a sheet feed stacker 221, are picked up one by one by an air separation device 222. Then, the sheet W1 is conveyed in a conveyance direction, leftward in FIG. 1, toward the image forming device 210. Next, when the sheet W1 conveyed from the sheet feeder 220 reaches the registration adjuster 230, the inclination of the sheet W1 with respect to the conveyance direction is corrected by a registration roller pair 231 disposed inside the registration adjuster 230.

After correction such as registration adjustment is performed by the registration roller pair 231, the sheet W1 is sent to the image forming device 210. Then, the sheet W1 is conveyed to the surface of a drum 211 having a cylindrical shape by a conveyance roller pair 214.

The drum 211 includes multiple recording-medium grippers 212. Each of the recording-medium grippers 212 nips a leading end of the sheet W1. By the rotation of the drum 211, the sheet W1 is fed to a position facing multiple head arrays 100. To be specific, the multiple head arrays are head arrays 100K, 100C, 100M, 100Y, 100S, and 100P. Any one of the head arrays 100K, 100C, 100M, 100Y, 100S, or 100P is simply referred to as a head array 100 in the following description.

In the image forming device 210, the multiple head arrays 100 are arranged along the surface of the cylindrical drum 211 in the rotation direction. Each of the head arrays 100 discharges ink by an inkjet method. In addition, each of the head arrays 100 is arranged in a state of being filled with ink of a predetermined corresponding one of ink colors.

Each of the head arrays 100 is disposed at a predetermined position radially extending in accordance with the degree of curvature of the outer circumferential surface of the drum 211. Specifically, the position of each of the head arrays 100 is adjusted such that a direction in which ink is discharged from each of the head arrays 100 is at an angle orthogonal to the outer circumferential surface of the drum 211. Accordingly, the head arrays 100 are at different angles from each other radially from the rotation axis of the drum 211. In other words, each of the head arrays 100 that serves as a discharge module is disposed at an angle at which each of the head arrays 100 is directed to the rotation center of the drum 211. The angle at which each of the head arrays 100 faces the drum 211 is adjusted such that each of the head arrays 100 discharges ink onto the outer circumferential surface of the sheet W1 held on the surface of the drum 211.

A dummy discharge receptacle 213 is disposed inside the outer circumferential surface of the drum 211. The dummy discharge receptacle 213 receives ink discharged by dummy discharge when the head arrays 100 do not discharge ink to the sheet W1.

When an image is formed on the sheet W1, the sheet W1 is conveyed to the drier 240.

A drier unit 241 is disposed in the drier 240. When the sheet W1 passes below the drier unit 241, moisture in the sheet W1 is evaporated.

The drier 240 includes a recording-medium reversing device 250 that includes a recording medium reversing mechanism 251. When double-sided printing is performed, the recording-medium reversing device 250 reverses a sheet W1. Next, the recording-medium reversing device 250 conveys the sheet W1 to the image forming device 210 again. Before the sheet W1 reaches the drum 211, the inclination of the sheet W1 is corrected by a registration roller pair 253 disposed inside the image forming device 210.

The sheet W1 that has been dried is conveyed to the sheet ejection device 290 and is stacked in a state in which an end of the sheet W1 is aligned with ends of sheets W1 that have been stacked in the sheet ejection device 290.

A droplet discharge operation in the image forming device 210 is controlled by an image formation controller 215 included in the image forming device 210. Note that the image formation controller 215 may control the entire operation of the inkjet printer 1000. Alternatively, the sheet feeder 220, the registration adjuster 230, and the drier 240 may individually include a controller. In such a case, each controller of the sheet feeder 220, the registration adjuster 230, and the drier 240 may control the entire operation of the inkjet printer 1000 in cooperation with the image formation controller 215.

Note that the inkjet printer 1000 is not limited to the configuration described above. Specifically, the inkjet printer 1000 may internally or externally include devices other than devices and components described above.

Configuration Example of Head Array

Figure 2:
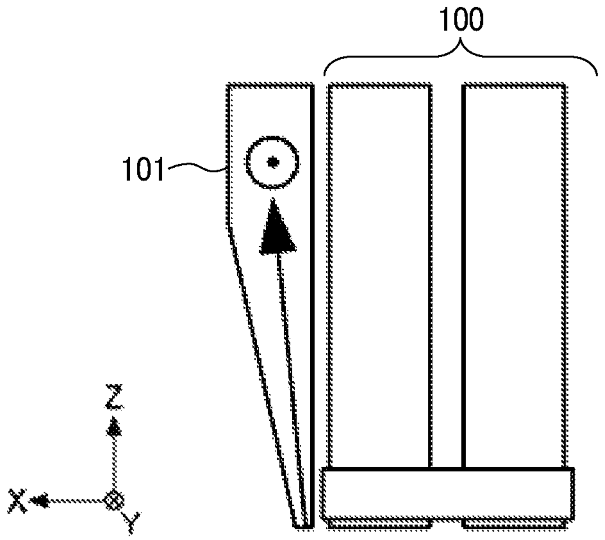
FIG. 2 is a diagram illustrating a configuration example of a head array according to a first embodiment of the present disclosure.

FIG. 2 is a diagram illustrating a configuration example of the head array 100 according to the present embodiment. Each of the head arrays 100 preferably includes multiple heads as illustrated in FIG. 2. In each of the head arrays 100, multiple heads are arranged in a staggered manner. A duct 101 is disposed for each of the head arrays 100. In other words, preferably, no filter is disposed for each of the head arrays 100.

An arrow illustrated in FIG. 2 indicates a direction of an air flow generated through the duct 101, in the vicinity of discharge ports of the head array 100 to collect ink mist, as a generated matter when ink is discharged from the head array 100. Note that arrows are illustrated in FIGS. 3, 4, 5, 6, 7, and 9 related to the following description and each of the arrows indicates a rough flow of air employed in embodiments of the present disclosure to collect mist that floats in the vicinity of the discharge ports of the head arrays 100. In embodiments of the present disclosure, the mist flows and is collected in the direction of the air flows indicated by arrows in FIGS. 3, 4, 5, 6, 7, and 9.

Figure 3:
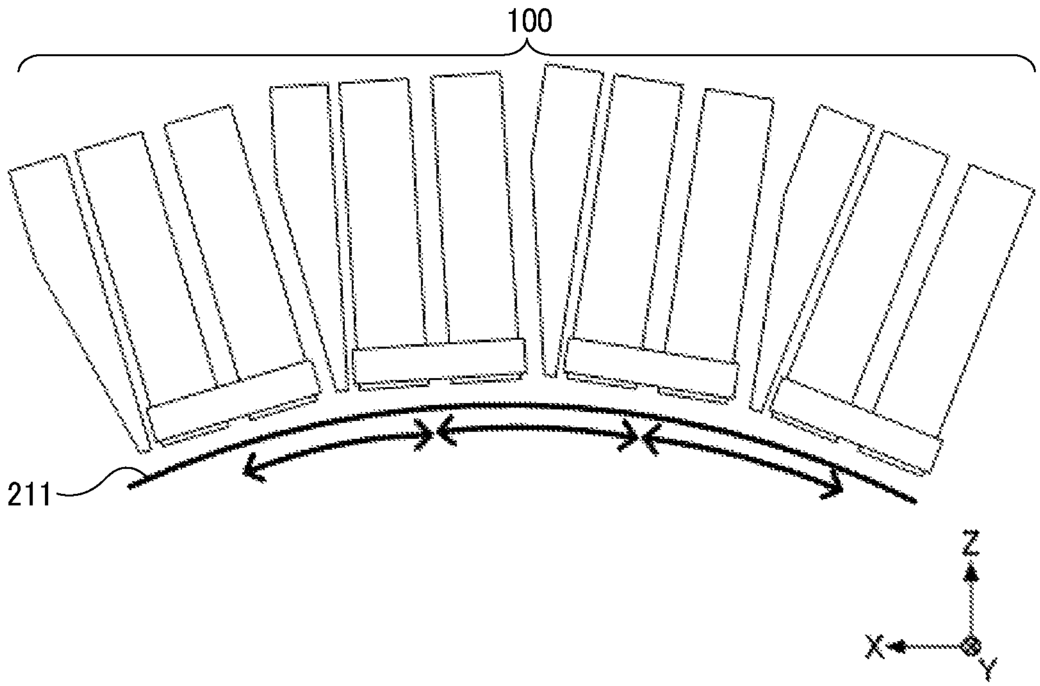
FIG. 3 is an enlarged view of multiple head arrays of FIG. 1.

FIG. 3 is an enlarged view of the multiple head arrays 100 illustrated in FIG. 1, according to the present embodiment. As illustrated in FIG. 3, the multiple head arrays 100 are arranged at predetermined intervals along the outer circumferential surface of the drum 211.

As illustrated in FIG. 2, each of the head arrays 100 includes no filter. Thus, the interval between adjacent two of the head arrays 100 can be narrowed. Accordingly, the entire width in which the multiple head arrays 100 are arranged can also be reduced. Thus, the size of the inkjet printer 1000 can be reduced.

Control Sample

Figure 4:
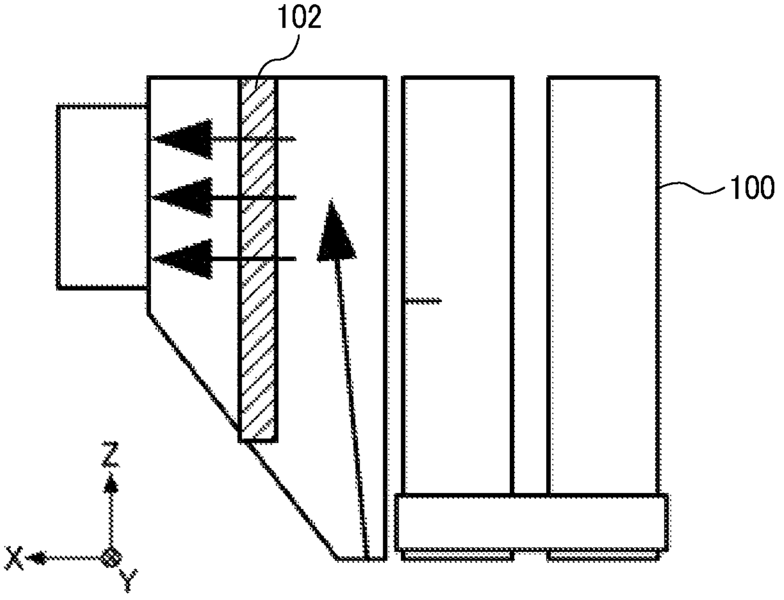
FIG. 4 is a diagram illustrating a configuration example of a head array according to a control sample of the present disclosure.

As a control sample with respect to the head array 100 according to the first embodiment illustrated in FIG. 2, a configuration example is illustrated in FIG. 4, in which the size of the inkjet printer 1000 is likely to increase by provision of a mist collection mechanism in the head array 100.

FIG. 4 is a diagram illustrating a configuration example of the head array 100 according to the control sample. Compared with the configuration of the head array 100 illustrated in FIG. 2, the control sample is different in that the head array 100 includes a filter 102 arranged in a direction in which the head arrays 100 are arranged, which is the rotation direction of the drum 211. For this reason, in the control sample of FIG. 4, a space is provided in which the filter 102 can be held in a dimension of the head array 100 in the rotation direction of the drum 211. In other words, in the control sample, the size of the head array 100 is likely to be larger than the size of the head array 100 of the configuration illustrated in FIG. 2, because of the inclusion of the filter 102. In particular, in the example of FIG. 4, the size of each of the head arrays 100 increases in the direction in which the head arrays 100 are arranged.

Figure 5:
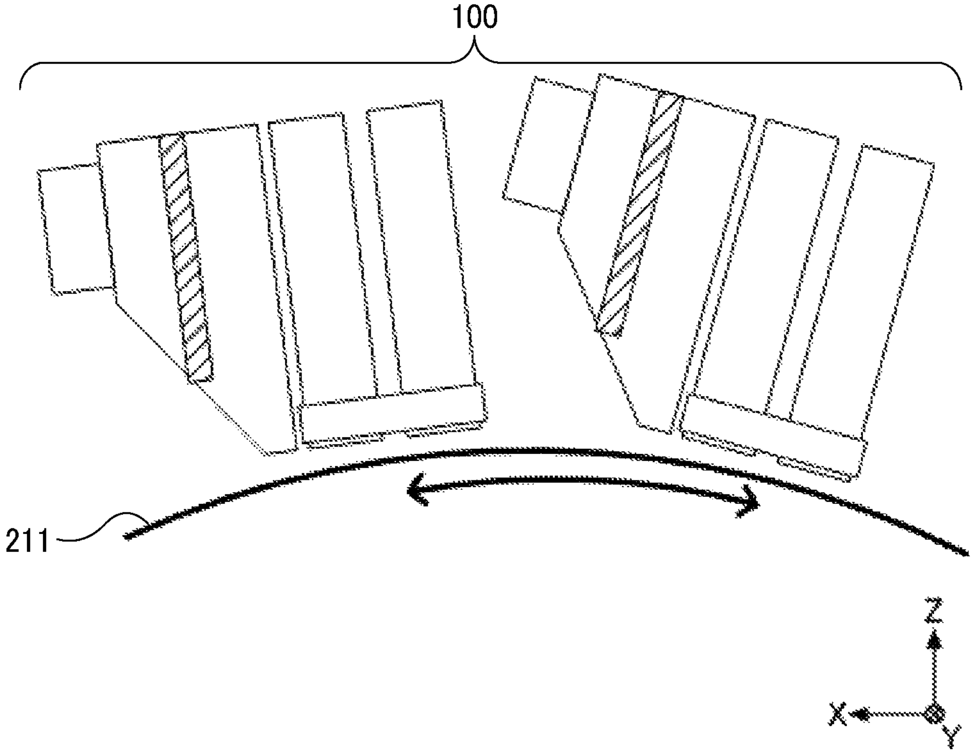
FIG. 5 is a diagram illustrating a configuration example of multiple head arrays according to the control sample of the present disclosure.

FIG. 5 is a diagram illustrating a configuration example of the multiple head arrays 100 according to the control sample. FIG. 5 illustrates an example in which the head arrays 100 according to the control sample illustrated in FIG. 5 are arranged around the drum 211, in a similar manner to FIG. 3.

The size of each of the head arrays 100 is large. Thus, the entire width in which the multiple head arrays 100 are arranged is likely to be large. Accordingly, the size of the inkjet printer 1000 is likely to be large.

Configuration Examples of Suction Device and Connector

Figure 6:
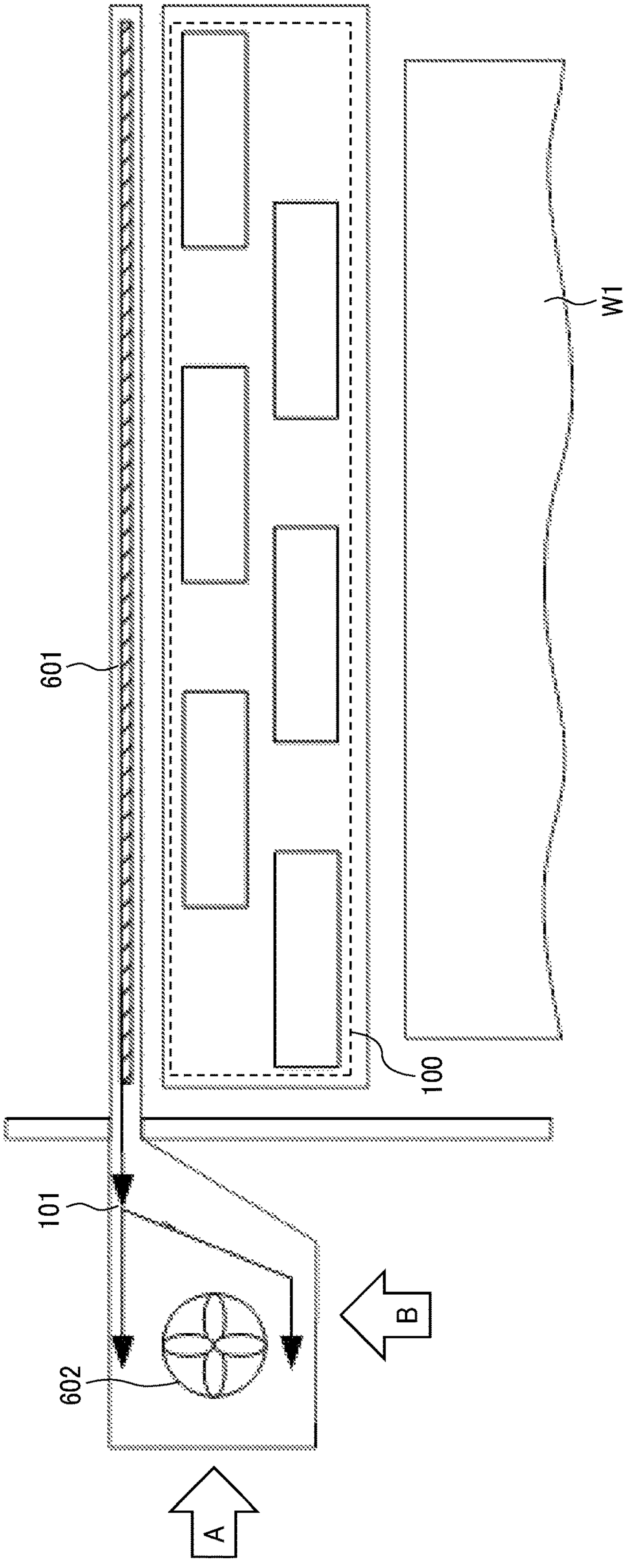
FIG. 6 is a diagram illustrating a configuration example of a fan that serves as a suction device, and a duct that serves as a connector, according to an embodiment of the present disclosure.

FIG. 6 is a diagram illustrating a configuration example of a fan 602 that serves as a suction device, and a duct 101 that serves as a connector, according to the present embodiment. As illustrated in FIG. 6, when mist is generated in the vicinity of an area in which ink adheres to a sheet W1, the mist is first sucked from an intake port 601.

The mist that is sucked from the intake port 601 is sent toward the fan 602, which is an example of a suction device, through the duct 101. The duct 101 is an example of a connector that connects the head array 100, which is an example of the discharger, and the fan 602.

Note that the suction device is not limited to the fan 602. For example, the suction device may be a suction device that includes no blades.

Further, the connector does not necessarily have the size, the shape, and the configuration as described above. Accordingly, the connector may have a shape other than the shape described above. For example, the connector may have a length and a shape different from the length and the shape illustrated in FIG. 6.

First Example of Collector

Figure 7:
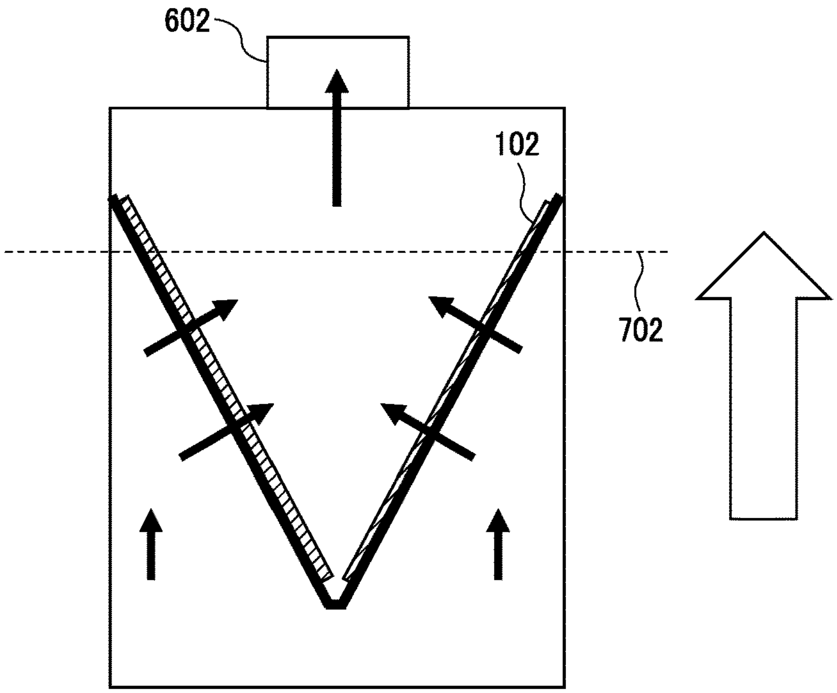
FIG. 7 is a diagram illustrating a first example of a collector, viewed from a viewpoint A in FIG. 6.

The filter 102 functions as a collector that collects mist. FIG. 7 is a diagram illustrating a first example of the collector, viewed from a viewpoint A illustrated in FIG. 6.

Figure 8:
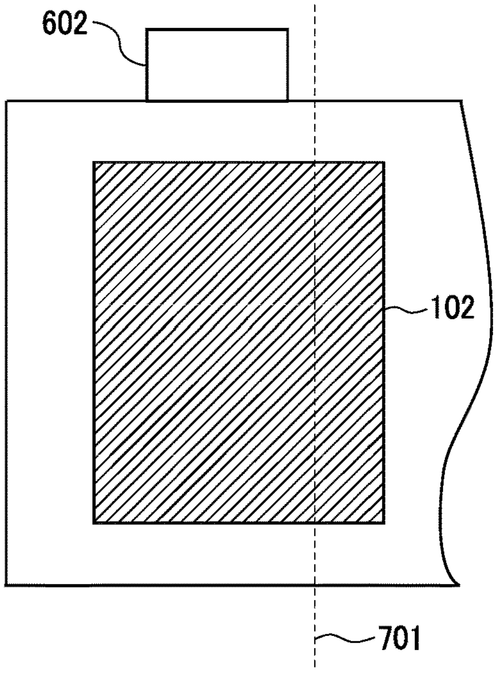
FIG. 8 is a diagram illustrating the first example of the collector, viewed from a viewpoint B in FIG. 6.

FIG. 8 is a diagram illustrating the first example of the collector, viewed from a viewpoint B illustrated in FIG. 6.

The collector is described with an example in which the fan 602 is arranged as illustrated in FIGS. 7 and 8 and the duct 101 as illustrated in FIG. 6, which are simplified for the sake of explanation, in the following description. In the above example, the direction that extends from the bottom to the top in FIG. 7 is a suction direction in which mist is sucked. The suction direction is a direction in which mist flows and moves due to the airflow generated by the fan 602.

Note that the position of the filter 102 is not limited to the positions illustrated in FIGS. 7 and 8 as long as the filter 102 is disposed upstream from the fan 602 in the suction direction and on a path formed by the duct 101. Note that in FIG. 7, the position of the fan 602 is most downstream and the lower side of FIG. 7 is upstream in the suction direction.

It is desirable that the fan 602 and the filter 102 are arranged outside a region in which the head arrays 100 perform image formation on the sheet W1. In other words, desirably, the fan 602 and the filter 102 are disposed outside the sheet W1 in the width direction.

In a case in which the fan 602 is arranged as illustrated in FIG. 7, when the fan 602 starts suction, the fan 602 discharges, for example, air. Accordingly, the air pressure in an area around the fan 602, which is an area below the fan 602 in FIG. 7, is reduced. Accordingly, the area around the fan 602 has a so-called negative pressure. Thus, for example, air flows from the bottom to the top in FIG. 7.

In FIG. 7, the direction in which, for example, mist and air are moved by the fan 602 is from the bottom to the top, and the suction direction is from the bottom to the top as a whole. In FIG. 7, the suction direction is indicated by a white arrow. As described above, the suction direction is determined by the arrangement of the fan 602.

In such a flow of mist and air as described above, air containing mist flows toward the fan 602 via the filter 102. The filter 102 is disposed on the path formed by the duct 101. Accordingly, the filter 102 can collect the mist.

The filter 102 is disposed to filter air flow that contains mist. For this reason, the filter 102 is disposed in a channel through which the air flow containing mist passes. For example, the mist-containing air that is collected through the duct 101 (see FIG. 6) flows in a direction in which air is discharged by the fan 602 as illustrated in FIG. 7.

In this case, desirably, the filter 102 is disposed in a state in which surfaces of the filter 102 are directed in directions intersecting the suction direction of mist. Each of the surfaces of the filter 102 is disposed to face the direction orthogonal to the suction direction, which is simply referred to as an orthogonal direction in the following description, or to face the orthogonal direction in a state of being inclined with respect to the orthogonal direction.

FIG. 7 illustrates an arrangement example in which the surfaces of the filter 102 are not on the same plane with respect to an imaginary plane in the orthogonal direction. In other words, the arrangement example of FIG. 7 is an arrangement example in which a cross-sectional shape of the filter 102 has a shape that imitates a letter V of the Roman alphabet as viewed from the viewpoint A in FIG. 6. As described above, the surfaces of the filter 102 that serve as filtering surfaces are disposed to be inclined with respect to an air flow direction of mist discharged from the fan 602. Accordingly, an area in which the filtering function is obtained by the filter 102 can be increased.

Note that the surfaces of the filter 102 may be curved surfaces such as uneven surfaces. Also, in a case in which a part of the surfaces of the filter 102 is curved, an area of the filter 102 that collects generated matter can be made larger compared with a case in which the filter 102 includes a single surface. A part of the filter 102 may be processed to increase the area of the filter 102 as describe above.

In FIG. 8, a cross section of the filter 102 in the suction direction is, for example, a first cross section 701.

Similarly, in FIG. 7, a cross section of the filter 102 in the orthogonal direction is a second cross section 702.

For example, while a cross-sectional area of the first cross section 701 is 0.007 m2 and a cross-sectional area of the second cross section 702 is 0.0084 m2. In contrast, when the cross-sectional shape of the filter 102 is the V shape as illustrated in FIG. 7, the area of the surfaces of the filter 102 is 0.012 m2. In other words, in the above-described example, the area of the surfaces of the filter 102 is about 1.2 to 1.5 times larger than each of the cross-sectional area of the first cross section 701 and the cross-sectional area of the second cross section 702.

Note that it is sufficient that the area of the surfaces of the filter 102 is larger than each of the cross-sectional area of the first cross section 701 and the cross-sectional area of the second cross section 702. Accordingly, the area of the surfaces of the filter 102, or the ratio between the area of the surfaces of the filter 102 and each of the cross-sectional area of the first cross section 701 and the cross-sectional area of the second cross section 702, is not limited to the above example.

Preferably, the cross-sectional shape of the filter 102 is a V shape as illustrated in FIG. 7. When the cross-sectional shape of the filter 102 is such a V shape, the area of the surfaces of the filter 102 can be increased and the filter 102 has a simple shape that allows the filter 102 to be easily taken out. Accordingly, the filter 102 can be easily replaced.

As illustrated in FIG. 6, the inkjet printer 1000 includes the duct 101 as the connector that serves as a path that extends from a position at which the head array 100 as the discharger discharges droplets to the fan 602 as the suction device. In the inkjet printer 1000 as the droplet discharge apparatus, the collector as the filter 102 is disposed at a position closer to a position at which the head array 100 as the discharger discharges droplets than a position at which the fan 602 as the suction device is disposed in the path formed in the suction direction. The filter 102 as the collector has irregularities such as convex and concave in, for example, the suction direction and has a shape such as a V shape. With such a shape as described above, the filter 102 as the collector has a cross-sectional area larger than the cross-sectional area of the duct 101 as the connector. As described above, when a collector such as the filter 102 that includes surfaces having a large area is employed, a droplet discharge apparatus can reduce the pressure loss due to the collector and reduce the size of the suction device. Accordingly, the size of the droplet discharge apparatus as a whole can be reduced.

Second Example of Collector

The filter 102 as the collector of a second example may have a shape as described below.

Figure 9:
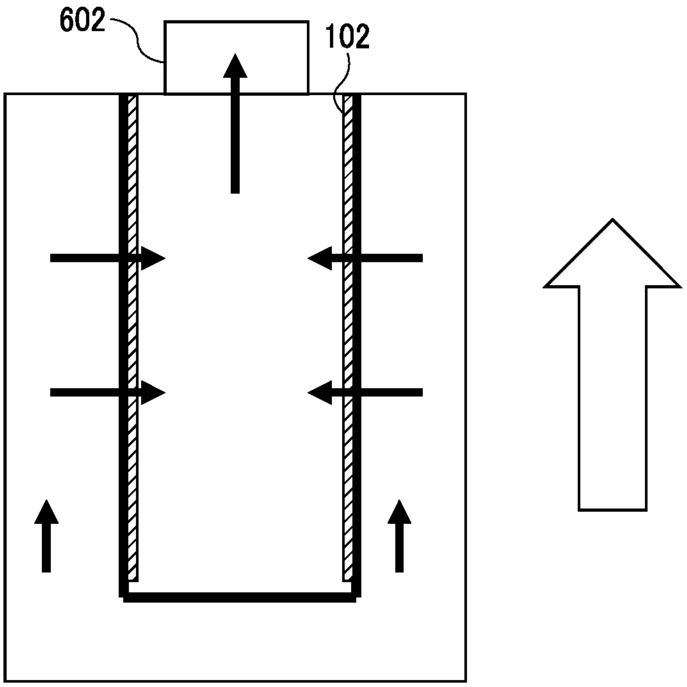
FIG. 9 is a diagram illustrating a second example of the collector, viewed from the viewpoint A in FIG. 6.

FIG. 9 is a diagram illustrating the filter 102 as the collector of the second example, viewed from the viewpoint A illustrated in FIG. 6. In the example illustrated in FIG. 9, the filter 102 has a tubular shape that is elongated in a direction in which the fan 602 discharges an airflow. In the filter 102 illustrated in FIG. 9, when mist collected via the duct 101 passes through an outer circumferential surface of the filter 102 and flows to the fan 602, an area of a plane of the filter 102 orthogonal to a direction in which air flows to the fan 602 can be increased.

Figure 10:
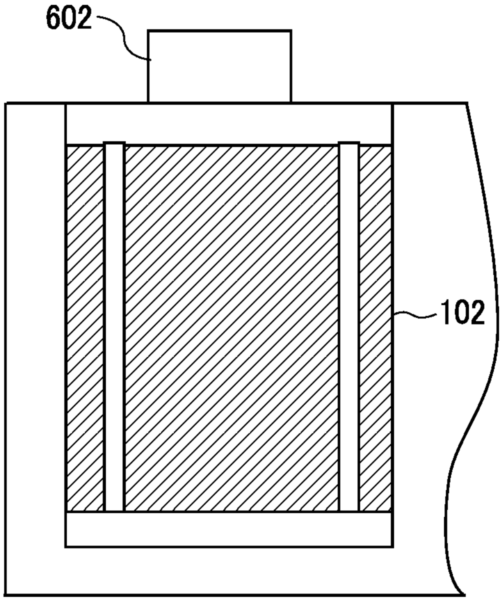
FIG. 10 is a diagram illustrating the second example of the collector, viewed from the viewpoint B in FIG. 6.

FIG. 10 is a diagram illustrating the filter 102 as the collector of the second example, viewed from the viewpoint B illustrated in FIG. 6. As illustrated in FIG. 10, the filter 102 may be secured with, for example, fasteners.

Figure 11:
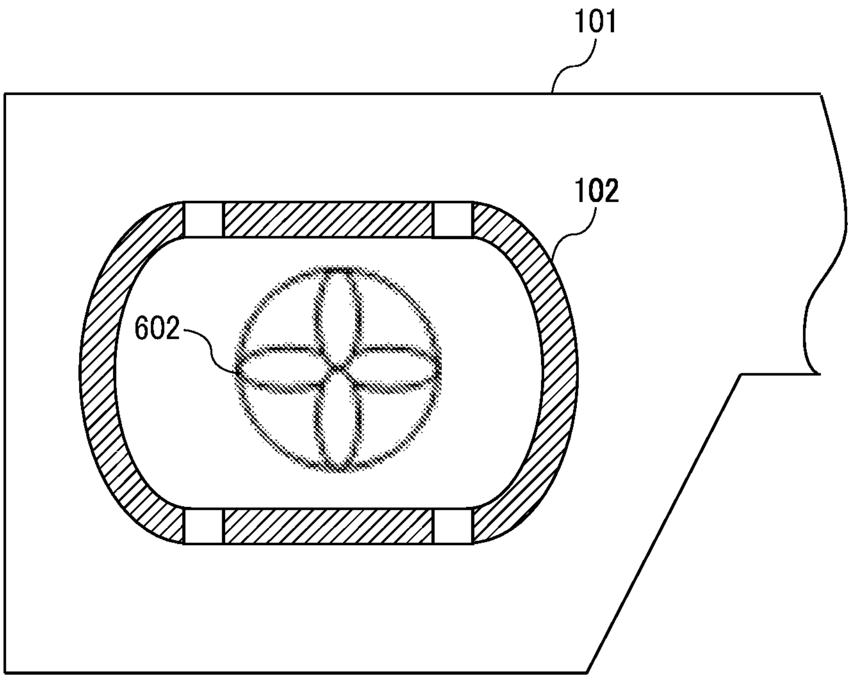
FIG. 11 is a diagram illustrating the second example of the collector, viewed from a similar viewpoint as illustrated in FIG. 6.

FIG. 11 is a diagram illustrating the filter 102 as the collector of the second example, viewed from a similar viewpoint as illustrated in FIG. 6.

As illustrated in FIGS. 10 and 11, the filter 102 may have a shape including a curved surface. Further, the filter 102 may have a cylindrical shape or a configuration in which multiple surfaces are included.

Preferably, the filter 102 is installed in the duct 101 with the filter 102 as a single sheet being folded or bent. When the filter 102 as a single sheet is folded, the filter 102 can be formed in a V shape, for example, as illustrated in FIG. 7. Similarly, when the filter 102 as a single sheet is bent, the filter 102 can be formed in, for example, a U shape.

When the filter 102 is formed with a single sheet, the filter 102, as a single unit, can be easily attached and detached.

On the contrary, when the filter 102 is formed with multiple number of sheets, the number of parts of the filter 102, to be replaced, increases. In addition, the timings at which multiple sheets of the filter 102 are to be replaced may be different. When such a filter 102 that is formed with multiple number of sheets as described above is employed, the workload for an operator to replace the filter 192 may increase. In addition, the size of the duct 101 increases when the area of the filter 102 with respect to the fan 602 is increased. Accordingly, the size of the inkjet printer 1000 may increase.

Furthermore, the filter 102 formed with a single sheet can reduce the pressure loss compared with a configuration in which multiple filters are arranged in series in the suction direction. In addition, when the multiple filters are arranged in series in the suction direction, the pressure loss due to the filters is likely to increase. For this reason, if a measure such as installation of a powerful fan is taken to collect mist, the size of an inkjet printer is likely to increase.

Further, when a filter is disposed close to a fan, the filter is likely to be clogged. In other words, when the filter is disposed close to the fan, the filter can collect mist only by an area of the filter corresponding to the area of the fan. For this reason, the area of the filter that can serve as a filter is small. Accordingly, the filter is likely to be clogged. Accordingly, the replacement frequency of the filter also increases. Thus, the workload on the operator increases.

On the other hand, with respect to the pressure loss before and after the filter, the larger the area of the filter, the flow rate per unit area can be reduced with respect to the same flow rate. Accordingly, the pressure loss of the filter as a whole decreases. Accordingly, in the present embodiment, the pressure loss before and after the filter 102 can be reduced. For this reason, the size of the fan 602 can be reduced. Accordingly, the size of the inkjet printer 1000 as a whole can be reduced. In addition, when the area of the filter 102 is large as described in the present embodiment, the cycle for replacing the filter 102 can be longer.

Second Embodiment

In a second embodiment of the present disclosure, preferably, the inkjet printer 1000 further includes an attachment as described below.

Figure 12:
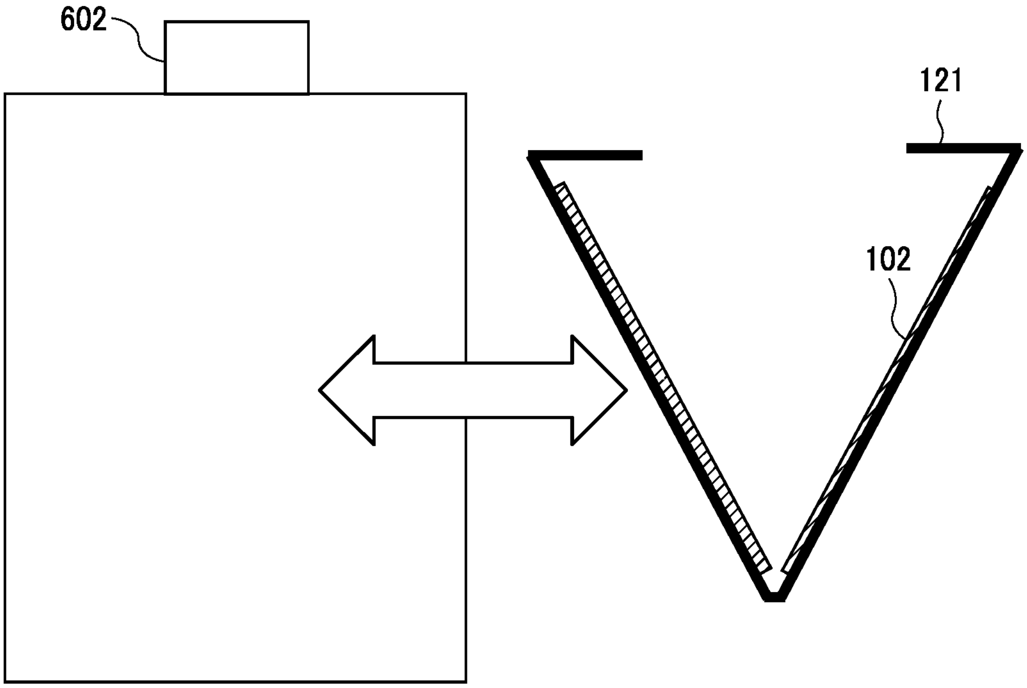
FIG. 12 is a diagram illustrating a configuration example of an attachment according to an embodiment of the present disclosure.

FIG. 12 is a diagram illustrating a configuration example of an attachment according to a second embodiment. An example of the attachment is a holder 121 illustrated in FIG. 12.

The holder 121 is made of, for example, a practical metal, or a polymer material. The holder 121 can be attached to and detached from the duct 101 together with the filter 102.

The filter 102 is installed on the holder 121. As described above, in the configuration in which the holder 121 and the filter 102 are integrated with each other, when an operation of attaching or detaching the holder 121 is performed, the filter 102 can be attached to or detached from the duct 101 together with the holder 121. For this reason, the attachment such as the holder 121 can enhance the workability of replacing the filter 102.

Third Embodiment

Figure 13:
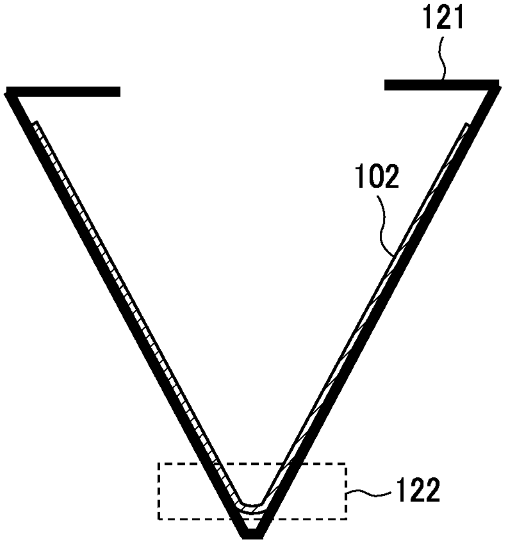
FIG. 13 is a diagram illustrating an example in which a filter as a single sheet is bent according to a third embodiment of the present disclosure.

FIG. 13 is a diagram illustrating an example in which the filter 102 formed as a single sheet is bent according to a third embodiment. In a third embodiment of the present disclosure, as illustrated in FIG. 13, preferably, the filter 102 as a single sheet is folded or bent to form multiple surfaces and the filter 102 is installed on the holder 121.

As illustrated in FIG. 13, when the filter 102 as a single sheet is bent, a bent portion 122 is formed, and multiple surfaces can be formed by the single-sheet filter 102.

As described above, when the filter 102 is formed by a single sheet, the workability of replacing the filter 102 can be enhanced.

Other Embodiments

Droplets may be of any liquid other than ink. For example, the droplets may be of colorless liquid. In other words, a droplet discharge apparatus according to an embodiment of the present disclosure may perform processing other than image formation using droplets of any liquid other than ink.

Generated matter may include something other than mist. For example, the generated matter may be powder.

Note that the present disclosure is not limited to the above-described embodiments. Therefore, in the present disclosure, addition of components or modification can be made without departing from the technical gist of the present disclosure. Accordingly, all technical matters included in the technical idea described in the appended claims are the object of the present disclosure. Note that the embodiments described above are preferable specific examples in the implementation of the present disclosure. It is apparent to those skilled in the art that various modifications and modifications can be made in the present disclosure without departing from the spirit or scope of the disclosure.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A droplet discharge apparatus comprising:

a head array to discharge droplets;

a suction device to suck generated matter when the head array discharges the droplets from discharge ports;

a duct disposed at the head array that defines a path through which the generated matter is to be sent in a suction direction from the discharge ports toward the suction device; and a filter disposed in the path formed by the duct to collect the generated matter;

wherein the filter is disposed at a second position closer to a first position at which the head array discharges droplets than a third position at which the suction device is disposed in the path formed in the suction direction;

wherein the filter has a shape such that an area of surfaces of the filter is larger than a cross-sectional area of the duct at the second position.

2. The droplet discharge apparatus according to claim 1, further comprising an attachment including the filter, the attachment together with the filter being attachable to and detachable from the duct, wherein the filter is disposed at the second position between the head array and the suction device in the path when the attachment together with the collector is attached to the connector.

3. The droplet discharge apparatus according to claim 2, wherein the attachment is a holder to hold the filter.

4. The droplet discharge apparatus according to claim 1, wherein the filter has a surface that is not on a same plane, multiple surfaces, or a curved surface.

5. The droplet discharge apparatus according to claim 1, wherein the filter is one folded or bent sheet.

6. The droplet discharge apparatus according to claim 1, wherein the head array is to discharge the droplets to form an image on a recording medium, wherein the filter is to cause air to pass toward the suction device and collect the generated matter, wherein the generated matter is part of the droplets generated when the droplets are discharged onto the recording medium.

7. The droplet discharge apparatus according to claim 1, wherein the suction device includes a fan.

8. The droplet discharge apparatus according to claim 1, wherein the head array includes a plurality of discharge heads.

9. The droplet discharge apparatus according to claim 1, wherein the suction device and the filter are arranged outside a region in which the head array performs image formation on a sheet.

10. The droplet discharge apparatus according to claim 1, wherein the suction device and the filter are disposed outside a sheet upon which the head array performs image formation in a width direction.

11. The droplet discharge apparatus according to claim 1, wherein a part of the duct where the suction device and the filter are disposed has a width larger than an intake part adjacent to the head array.

12. The droplet discharge apparatus according to claim 1, wherein the shape of the filter comprises one of a V-shape or a U-shape.

13. The droplet discharge apparatus according to claim 1, wherein the generated matter comprises mist or powder.

14. A droplet discharge apparatus comprising:

a head array to discharge droplets from discharge ports;

a connector comprising a duct disposed at the head array, wherein the duct forms a path within the head array in a suction direction that extends from an intake port at a first position adjacent to where the head array discharges the droplets, to a suction device; and a filter disposed in the path formed by the duct;

wherein the filter is disposed at a second position closer to the first position than a third position at which the suction device is disposed in the path formed in the suction direction;

wherein the filter has a shape such that an area of surfaces of the filter is larger than a cross-sectional area of the duct at the second position.

15. The droplet discharge apparatus according to claim 14, wherein the filter comprises a single sheet that is folded into a V-shape.

16. The droplet discharge apparatus according to claim 14, wherein the filter comprises a single sheet that is bent into a U-shape.

17. The droplet discharge apparatus according to claim 14, wherein the head array is to discharge the droplets to form an image on a recording medium, wherein the filter is to cause air to pass toward the suction device and collect generated matter, and wherein the generated matter is part of the droplets generated when the droplets are discharged onto the recording medium.

18. The droplet discharge apparatus according to claim 14, wherein the suction device includes a fan.

19. The droplet discharge apparatus according to claim 14, wherein a part of the duct where the suction device and the filter are disposed has a width larger than the intake port.

20. A droplet discharge apparatus comprising:

a plurality of head arrays each comprising multiple heads arranged in a width direction;

a duct disposed at each of the head arrays, wherein the duct forms a path in a suction direction that extends from an intake port disposed in the width direction at a first position adjacent to the multiple heads, to a suction device; and a filter disposed in the path formed by the duct;

wherein the filter is disposed at a second position closer to the first position than a third position at which the suction device is disposed in the path formed in the suction direction;

wherein the filter has a shape such that an area of surfaces of the filter is larger than a cross-sectional area of the duct at the second position.

* * * * *